Figure 1:
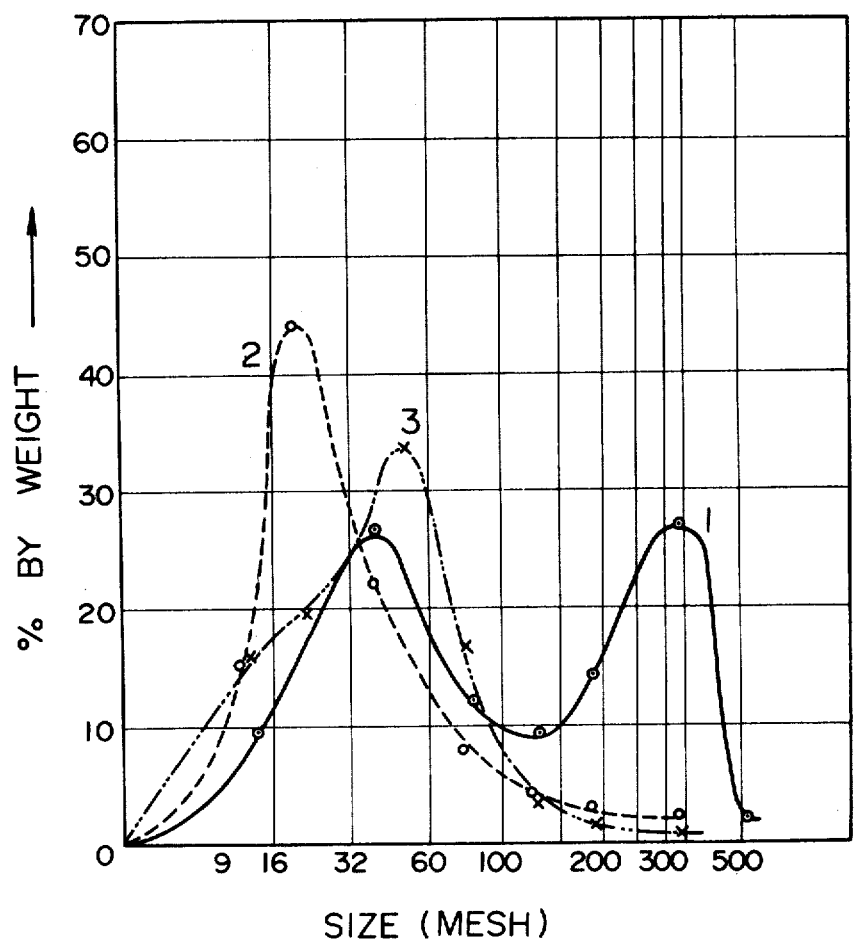

United States Patent [19]
Seki

[11] 3,933,634
[45] Jan. 20, 1976

[54] METHOD OF TREATMENT OF SLUDGES WITH SIZE-ADJUSTED CARBON

[76] Inventor: Toru Seki, No. 558, Kami-kizaki, Urawa, Saitama, Japan

[22] Filed: Aug. 9, 1972

[21] Appl. No.: 279,267

[30] Foreign Application Priority Data
Aug. 13, 1971 Japan.............................. 46-60968
Aug. 13, 1971 Japan.............................. 46-60969

[52] U.S. Cl. ...................... 210/46; 210/53; 210/77
[51] Int. Cl.² ................................................ C02B 1/20
[58] Field of Search ............ 210/10, 51, 52, 53, 75, 210/205, 216, 386, 400, 401, 406, 387, 39, 40, 46, 77

[56] References Cited
UNITED STATES PATENTS

| | | | |
|---|---|---|---|
| 2,895,614 | 7/1959 | Komline.............................. | 210/401 |
| 3,049,236 | 8/1962 | DeLara et al........................ | 210/400 |
| 3,142,638 | 7/1964 | Blaisdell et al. ..................... | 210/51 |
| 3,300,403 | 1/1967 | Kehoe................................... | 210/75 |
| 3,690,466 | 9/1972 | Lee et al.............................. | 210/406 |

FOREIGN PATENTS OR APPLICATIONS

| | | | |
|---|---|---|---|
| 1,960,365 | 6/1971 | Germany .............................. | 210/75 |
| 1,965,734 | 7/1971 | Germany .............................. | 210/75 |

Primary Examiner—Thomas G. Wyse
Assistant Examiner—Ivars Cintins
Attorney, Agent, or Firm—Wenderoth, Lind & Ponack

[57] ABSTRACT

A process for concentrating and separating solids from solid/liquid mixtures in the treatment of sewage sludge, which comprises incorporating into such sludge 2 to 10 % by weight of fine dust coal or lignite having such a size distribution that 30 to 50 % by weight of the whole particles have a finer size not greater than 100 mesh and 70 to 50 % by weight of the whole particles have a coarser size exceeding 100 mesh, mixing them under agitation, allowing the resulting admixture to stand still to separate the coal-containing concentrated sludge from the supernatant liquor, and if desired, filtering the coal-containing concentrated sludge to remove water therefrom; and a continuous dehydration apparatus which is used effectively for practice of said process.

6 Claims, 4 Drawing Figures

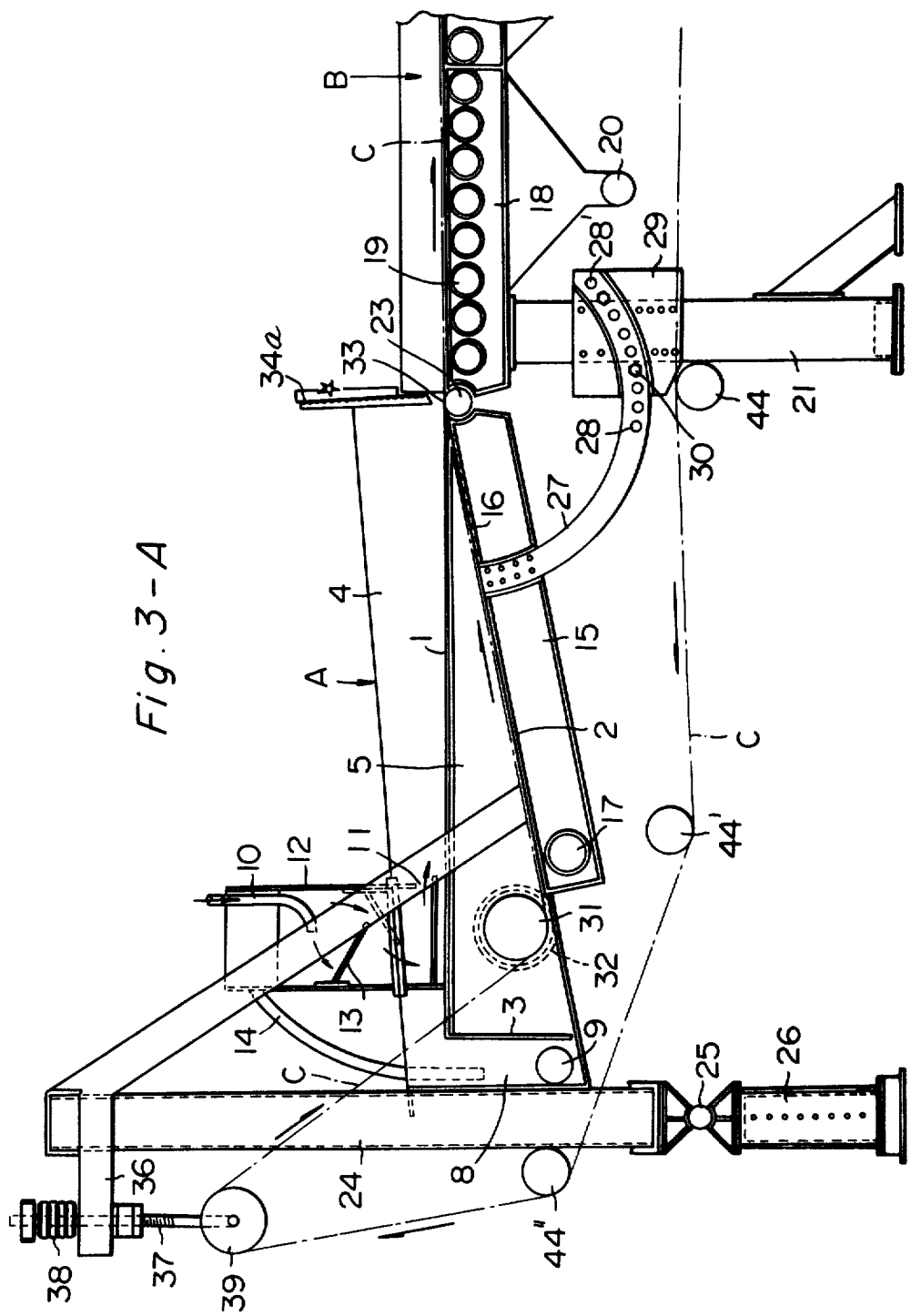

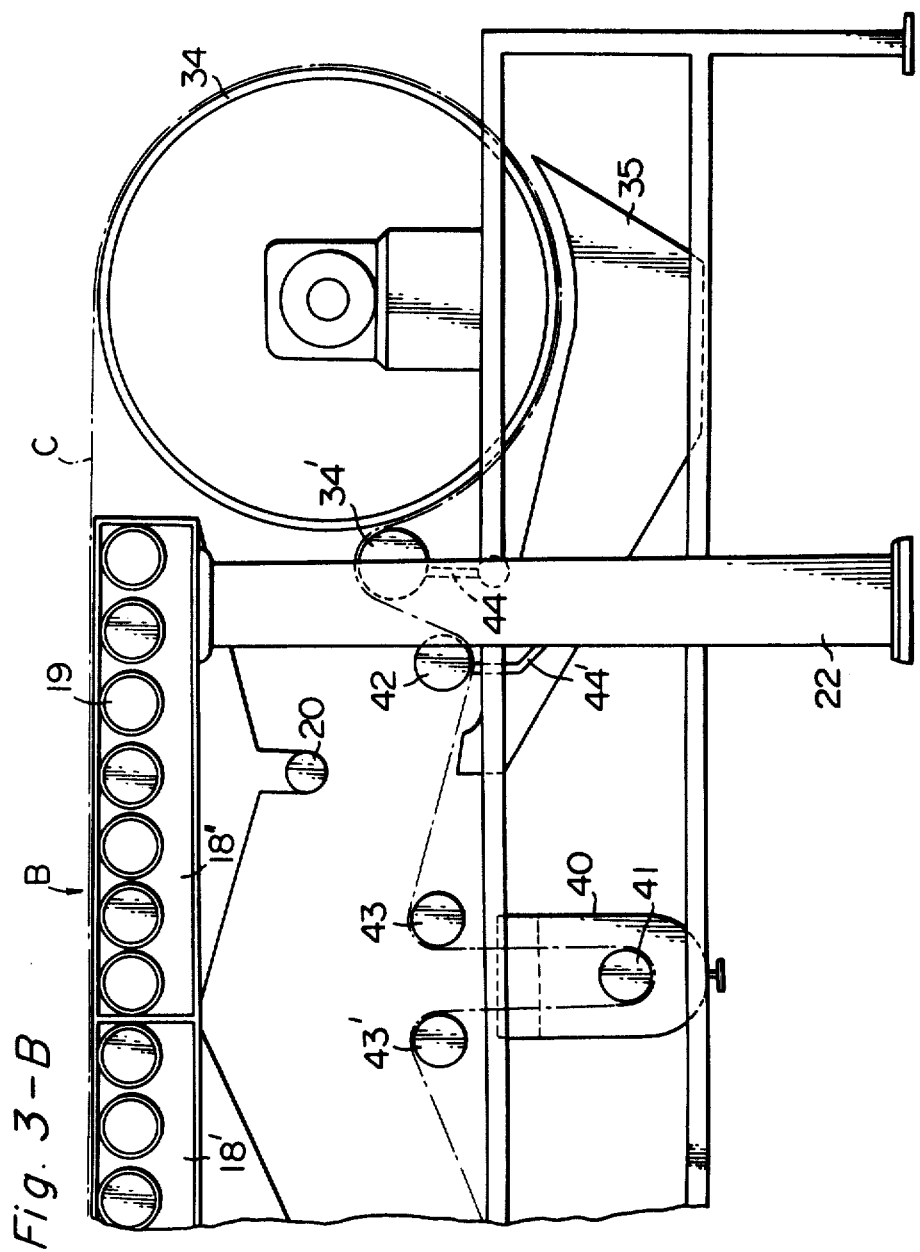

METHOD OF TREATMENT OF SLUDGES WITH SIZE-ADJUSTED CARBON

This invention relates to a process for separating sludge concentrates with use of fine dust coal or lignite. More specifically, the invention relates to a process for separating sludge solids in the highly concentrated state by employing fine dust coal or lignite having a specific size distribution, which comprises finer particles having a finer size within a specific range and coarser particles having a greater size within a specific range at a specific ratio.

In general, solid contents of excessive sludges or other concentrated sludges discharged from the process of the aerobic activated sludge treatment of excrement, sewage and waste water are about 4,000 to 13,000 ppm. For the treatment of such excessive sludges or concentrated sludges, various methods have been proposed. For instance, there has been proposed a method comprising incorporating into such sludge 5 to 30 % by weight of a iron-type coagulant such as iron chloride or iron sulfate and 5 to 30 % by weight of a neutralizing agent such as lime, dehydrating the admixture by employing a dehydrating apparatus and recovering the solids in the form of a cake. Incorporation of a carbonaceous substance such as naphtha carbon in conducting the above method has also been proposed as means for imparting the combustibility to the recovered cake.

However, in such conventional method employing a coagulant which has heretofore been used for cleaning city water, it is difficult to separate solids of the sludge from water, because solids of the sludge are present in the form of a very stable sol, well-admixed with water acting as the dispersion medium. More specifically, in the above conventional method, when the sludge is incorporated with the above chemicals and the admixture is allowed to stand still, it takes a very long time for solids of the sludge to coagulate and sediment. Since the phase separation between the sludge solids and the supernatant liquor proceeds in such state that the solids contain a great quantity of water therein, attainment of effective separation cannot be expected. Furthermore, in this conventional method, even when the coagulated sediments are subjected to a dehydration treatment such as filtration, the water content is still as high as 83 – 92 % by weight; therefore, the drying treatment of the recovered solids is not easy in many cases.

In concentration and separation of sludges, it is desired that the following two conditions are satisfied; one being that when an admixture of a sludge and a coagulant is allowed to stand still, the resulting sediment of the coagulated sludge solids is recovered for a short period time in the form of a non-bulky compact mass while the supernatant liquor is so cleaned that it can be discharged directly without any further cleaning treatment; and the other being that the dehydration of the coagulated sediment can be accomplished very easily and cakes of a very low water content are obtained. It is also desired that the cost of the coagulant is low.

It has now been found that in the treatment of excessive sludges or concentrated sludges, when fine dust coal or lignite having such a specific size distribution that it comprises particles of a specific finer size and particles of a specific coarser size at a specific ratio is used as a coagulant, the coagulation and sedimentation of the sludge solids can be accomplished very promptly while keeping the solids in the very highly concentrated state, and that the resulting coal-containing sludge concentrate is very excellent in the filtering property and its water content can be reduced to 42 to 60 % by weight. Based on the above findings, I have now arrived at this invention.

In accordance with this invention, there is provided a process for concentrating and separating solids of excessive sludges or concentrated sludges discharged from the treatment of excrement, sewage and other filthy water, which comprises incorporating into such sludge 2 to 10 % by weight of fine dust coal or lignite having such a size distribution that 30 to 50 % by weight of the whole particles have a finer size not greater than 100 mesh and 70 to 50 % by weight of the whole particles have a coarser size exceeding 100 mesh, mixing them under agitation, allowing the resulting admixture to stand still to separate the coal-containing concentrated sludge from the supernatant liquor, and if desired, filtering the coal-containing concentrated sludge to remove water therefrom.

Further, in accordance with this invention, there is provided a process for concentrating and separating solids of excessive sludges or concentrated sludges discharged from the treatment of excrement, sewage and other filthy water, which comprises incorporating into such sludge 2 to 10 % by weight of fine dust coal or lignite having such a size distribution that 30 to 50 % by weight of the whole particles have a finer size not greater than 100 mesh and 70 to 50 % by weight of the whole particles having a size exceeding 100 mesh, mixing them under agitation, incorporating into the mixture a coagulant of the iron-aluminum type in an amount of from one-fiftieth to one-tenth of the fine dust coal or lignite, allowing the resulting mixture to stand still to separate the coal-containing concentrated sludge from the supernatant liquor, and if desired, filtering the coal-containing concentrated sludge to remove water therefrom.

In the above process of this invention, the resulting coal-containing concentrated sludge exhibits a much lower resistance to filtration than sludge concentrates formed by the above-mentioned conventional methods, and the water content of the resulting filter cake is much lower than in the conventional methods.

In general, properties of excessive sludges and concentrated sludges vary greatly depending on properties of waste water or sewage from which they have been discharged, and it is difficult to maintain the filtering and dehydrating efficiency at a high level in any of sludges regardless of variation in properties. For instance, when the coal-containing concentrated sludge coming from the above process is filtered and dehydrated, it is indispensable that coarser particles of the fine dust coal or lignite contained in the sludge sediment uniformly on the entire face of filter cloth in the form of a precoat layer. However, the time required for the coarser particles to separate from the concentrated sludge and sediment on the filter cloth in the form of a precoat layer varies greatly depending on such factors as properties of the starting sludge, properties of the fine dust coal or lignite, the thickness of the coalcontaining concentrated sludge fed on the filter cloth, the storage and residence length and the forwarding rate of the filter cloth.

I have found that in filtering and dehydrating the above-mentioned coal-containing concentrated sludge by feeding it onto the surface of a filter cloth, it is made possible to accomplish filtration and dehydration of said coal-containing concentrated sludge with very high efficiency regardless of variation of properties of the starting excessive sludges or concentrated sludges, by continuously forwarding the filter cloth to a liquid reservoir to which the coal-containing concentrated sludge is fed and to a filtering zone in which vacuum suction filtration is effected, moving the filter cloth to the bottom of the liquid reservoir with an inclination to the liquid surface in such a manner that the filter cloth crosses the liquid surface at least on one side of the liquid reservoir, and providing a member capable of adjusting freely the inclination angle of the filter cloth to be forwarded to the bottom of the liquid reservoir.

Thus, there is provided an apparatus for the continuous dehydration of sludges, which comprises a liquid reservoir for receiving an admixture of fine dust coal and a sludge, a filtering zone connected with said liquid reservoir, in which vacuum suction filtration is effected, and an endless filter cloth which is continuously forwarded to said liquid reservoir and filtering zone, wherein said liquid reservoir is provided with a bottom portion which is inclined to the liquid surface and is disposed to cross the liquid surface at least at the portion connecting the liquid reservoir with the filtering zone; the filtering zone is constructed of a vacuum chamber provided with roll bars at the upper portion thereof; the endless filter cloth is so disposed that it is at first introduced into the bottom portion of said liquid reservoir while being kept in contact with the bottom portion along a length sufficient to form a precoat layer on the surface of the endless filter cloth, and then the filter cloth is introduced on the roll bars of the filtering zone; and wherein said liquid reservoir is connected pivotably with the filtering zone and is provided with a member for adjusting the elevation angle of the bottom portion of the liquid reservoir.

The process of this invention is useful for treatment of various sludges, for instance, concentrated sludges or excessive sludges discharged from the treatment of various waste waters, e.g., city sewage water, excrement, waste water from livestock farms, waste water from marine product factories, waste water from butcheries, waste water from dye works, waste water from chemical-manufacturing factories and waste water from other ordinary factories or works, etc. In general, excessive sludges discharged from the treatment of such waste waters contain water at a content of 90 to 99 %, the remainder being composed of ashes and combustible components ( which will be referred to inclusively as "solids" hereinbelow). As mentioned above, these solids are present in the form of a very stable sol well-admixed with water acting as a dispersion medium. According to this invention, it is possible to separate effectively and promptly solids present in the state stably dispersed in the sludge. In the process of this invention, solids can be effectively separated also from a secondary sludge concentrate ( having a water content of 90 to 95 % ) formed by concentrating the sludge by a conventional method such as mentioned above.

In this invention it is essential that fine dust coal or lignite comprising the above-mentioned finer particles and coarser particles at a specific ratio is incorporated in an excessive sludge or partially concentrated sludge in an amount of 2 to 10 % by weight based on the sludge, whereby it is made possible to coagulate and separate the solids in the sludge promptly and effectively.

Any of fine dust coals and lignites may be optionally used in this invention after adjusting the particle size distribution so that finer particles having a size not greater than 100 mesh occupy 30 to 50 % by weight of the whole particles and coarser particles having a size exceeding 100 mesh occupy 70 to 50 % by weight of the whole particles. For instance, precipitated fine dusts of low grade formed as by-products at the dressing step of the coal mining industry and coal dusts discharged from the steps of digging and dressing of lignites of low carbonization degree are usually discarded at collieries as useless by-products having no commercial value. According to this invention, such fine dusts of low grade or dusts of brown coal or lignite of low carbonization degree may be used advantageously as a coagulant for precipitating and sedimenting solids of sludges, after they have been subjected to the above-mentioned size distribution adjustment. These fine dusts of low grade and dusts of brown coal of lignite of low carbonization degree are much cheaper than commercially available coal dusts of high carbonization degree, and their activity of coagulating solids in sludges is rather higher than such commercially available coal dusts. In general, these fine dusts of low grade and dusts of brown coal or lignite of low carbonization degree comprises about 60 to about 80 % by weight of particles having a size ranging from 32 mesh (0.5 mm) to 325 mesh (0.043 mm), and they have a calorific power of 3500 to 5000 Kcal/Kg and an ash content ranging from 10 to 40 %. In this invention, these fine dust coals and lignite dusts are used as a precipitant and coagulant for sludge solids, after their size distribution has been adjusted as mentioned above.

In the fine dust coal or lignite to be used in this invention it is especially important that particles having a size not greater than 100 mesh, preferably not greater than 150 mesh (0.1 mm) but greater than 325 mesh (0.043 mm), occupy at least 30 % by weight of the whole particles. This requirement is essential for promoting coagulation and sedimentation of sludge solids. On the other hand, in case the amount of coarser particles having a size exceeding 100 mesh is less than 50 % by weight of the whole particles, prompt coagulation and sedimentation of sludge solids in the highly concentrated state cannot be expected any longer. Among finer and coarser particles constituting the fine dust coal or lignite, it is finer particles having a size not greater than 100 mesh, preferably a size ranging from 150 to 300 mesh, that exhibit an action of absorbing colloidal solids dispersed in the sludge on the surfaces thereof and thus coagulating them. The finer particles adsorbing the sludge solids thereon coagulate one another, resulting in the particle growth, and with sedimentation of coarser particles, these finer particles are also sedimented in the flocky state. In short, the activity of coagulating and sedimenting sludge solids by the fine dust coal or lignite is owing to cooperation of finer particles and coarser particles present in the fine dust coal or lignite at a specific ratio, which can be readily understood from the following explanation made hereinbelow by reference to accompanying drawings.

Figure 2:
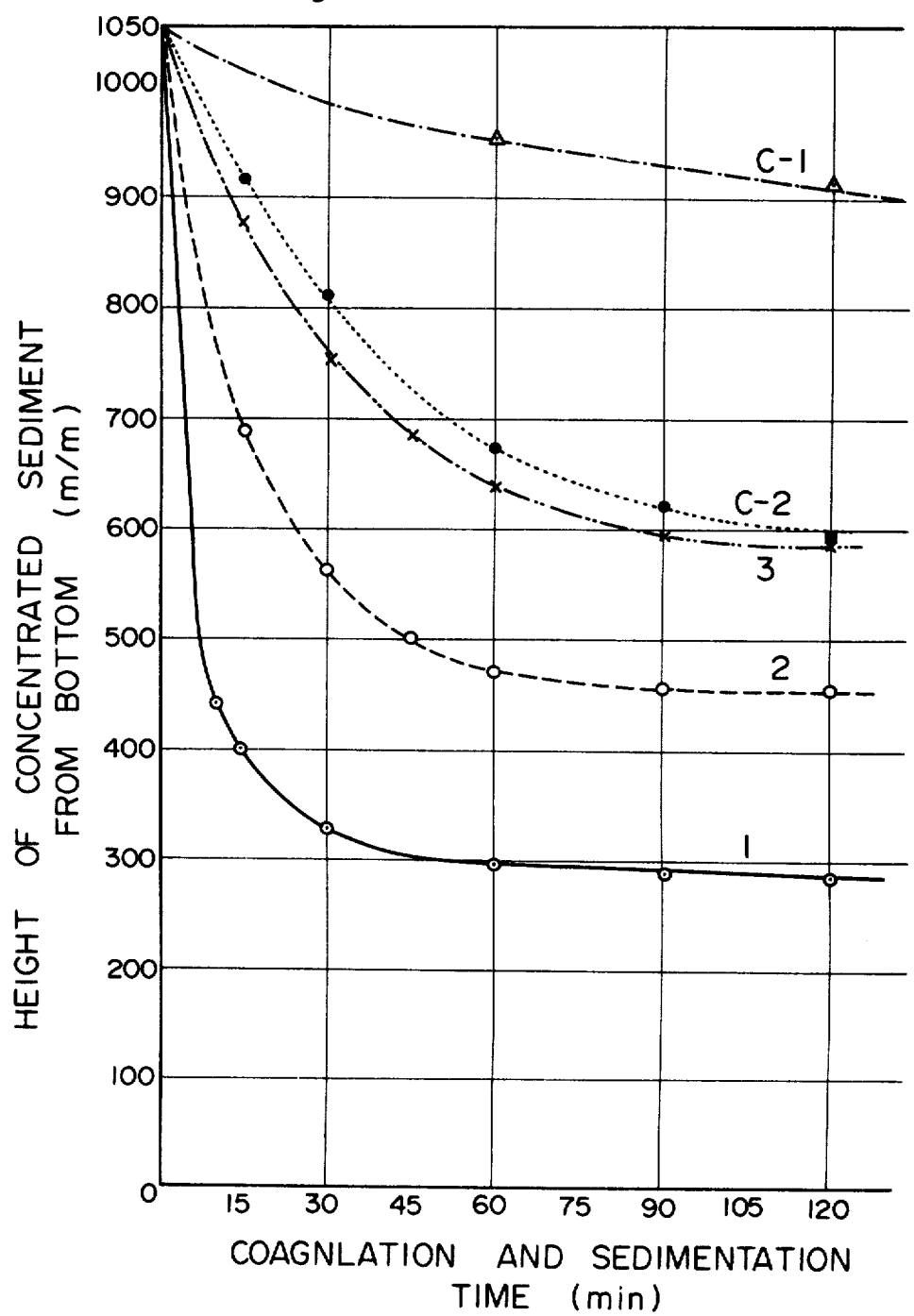

In the drawings, FIG. 1 is a graph illustrating the size distribution in the size-adjusted fine duct coal 1 to be used in this invention and comparative fine dust coals 2 and 3;

FIG. 2 is a graph illustrating the relation between the height of the sedimented solids and the sedimentation period, attained when a sludge is treated with above fine dust coals 1, 2 and 3 shown in FIG. 1; and FIGS. 3-A and 3-B are side views illustrating the arrangement of the apparatus of this invention.

In FIG. 1 there are shown size distribution curves of the size-adjusted fine dust coal 1 to be used in this invention and fine dust coals 2 and 3 in which the size distribution requirement of this invention is not satisfied. As is seen from the curve 1, the size-adjusted fine dust coal to be used in this invention is characterized in that two peaks corresponding with finer and coarser particles, respectively, appear in its size distribution curve.

In FIG. 2 there are illustrated results obtained when the above fine dust coals 1, 2 and 3 are separately added to an excessive sludge having a solid content of 9500 ppm in an amount of 5 % by weight and the sludge is allowed to stand still in a precipitation tank having a liquid surface height of 1050 cm. The curve C-1 of FIG. 2 illustrates the result obtained when the coal-free starting sludge is allowed to stand still. In this case, sludge solids are not effectively coagulated or precipitated. As is seen from curves 2 and 3 of FIG. 2, when non-size-adjusted fine dust coals 2 and 3 are incorporated into the sludge, the solids are concentrated only to such a degree that the volume of the sedimented solids is about one-half of the volume of the starting sludge. In contrast, in the case of the size-adjusted fine dust coal 1 comprising finer particles and coarser particles at a specific ratio, as is seen from the curve 1 of FIG. 2, the sludge solids are coagulated, sedimented and concentrated for a short time so effectively that the volume of the solids is less than one-third of the volume of the starting sludge.

In FIG. 2, the Curve C-2 illustrates the result obtained when as a comparative finely divided carbon, naphtha carbon formed as a by-product in the petrochemical industry (having an average particle size of 40 $\mu$ at a content of 80%) is incorporated in the sludge in an amount of 5 % by weight. If the coagulation and sedimentation of solids in the sludge be influenced merely by the surface area of a carbonaceous substance used as the coagulant, it may be expected that the above naphtha carbon will be able to coagulate and sediment the sludge solids more promptly at a higher concentration. However, contrary to the above expectation, only in the case of the size-adjusted fine dust coal of this invention comprising finer particles and coarser particles at a specific ratio, prompt coagulation and sedimentation of sludge solids at a high concentration can be attained.

In practicing the process of this invention, a fine dust coal or lignite having a size distribution adjusted as mentioned above is incorporated in an excessive or partially concentrated sludge in an amount of 2 to 10 % by weight, preferably 2 to 7 % by weight, especially preferably 3 to 5 % by weight, based on the sludge, and the admixture is agitated sufficiently to bring about a homogeneous, well-compounded state between the coal and sludge. Then, the admixture is introduced into a concentration or separation tank, and it is allowed to stand still for about 20 minutes to about 2 hours, preferably 40 minutes to 50 minutes. Thus, substantial portions of the solids contained in the sludge are separated from the supernatant liquor, and are sedimented and deposited as coal-containing concentrated sludge.

Accordingly, the supernatent from which substantial portions of solids have been separated is discharged as it is or it is returned to the waste water treatment plant and is used as water for primary washing of sludges.

As described above, properties of excessive sludges or concentrated sludges to be treated, vary greatly depending on properties of the original waste water, and it is generally very difficult to obtain a coagulating agent which can exhibit an equivalent effect regardless of properties of starting sludges to be treated. However, in this invention, since in the fine dust coal or lignite the size distribution is preliminarily adjusted, it is possible to cope readily with variety in properties of excessive sludges or concentrated sludges to be treated. In general, it is preferred to determine, based on preliminary experiments, patterns of size distributions giving optimum results depending on types of sludges to be treated within the size distribution range specified in this invention. In some cases, it is preferred to conduct a preliminary treatment for uniformalizing concentrations and properties of sludges, for instance, a re-aerating treatment, prior to the coagulation and sedimentation treatment of this invention. In order to change the pattern of the size distribution in the fine dust coal or lignite to be used in this invention, it is possible to incorporate a finely divided carbonaceous material formed as a byproduct at the thermal cracking step in the petrochemical industry, such as naphtha carbon or oil carbon, in an amount of 5 to 30 % by weight based on the fine dust coal or lignite, whereby the coagulating property of sludge solids can be improved or modified.

The objects of this invention can be fully attained only by the use of the above-mentioned fine dust coal or lignite having a specific size distribution such as mentioned above. However, in order to further lower the water content in a cake of the coal-containing concentrated sludge solids and further lower the solid content in the filtrate water, it is especially preferred to use, in combination with the above-mentioned sizeadjusted fine dust coal or lignite, a coagulant of the iron-aluminum type in an amount of one-fiftieth to one-tenth, especially one-twentieth to one-fifteenth, of the fine dust coal or lignite. As such coagulant there may be employed, for instance, a coagulant of iron sulfate-aluminum sulfate type. For example, a coagulant obtained by treating red mud discarded from the aluminum-refining process with sulfuric acid, is advantageously used in this invention. When such coagulants of the iron salt-aluminum salt type, especially a coagulant composed of sulfuric acid-treated red mud, are used in the process of this invention, they cause formation of flocky hydroxides of aluminum, iron and titanium or the like in the sludge, and these flocky hydroxides catch and coagulate colloidal solids in the sludge effectively. These coagulants of the ironaluminum type are generally effective when the pH of the sludge is maintained on the alkaline side (for instance, pH of 8 to 8.5). However, in this invention, since such coagulants are used in combination with fine coal dust or lignite powder, additon of an alkalizing agent such as limestone need not be effected, but such alkalizing agent may be used depending on the kind of the sludge to be treated and any particular disadvantage is not brought about by use of such alkalizing agent.

In the embodiment of this invention employing a coagulant of the iron-aluminum type, the size-adjusted fine dust coal or lignite is in advance incorporated into an excessive sludge or partially concentrated sludge and they are agitated. Then, a coagulant of the iron-aluminum type is added to the admixture of the sludge and size-adjusted fine dust coal or lignite. This sequence of addition is very important. In case the coagulant of the iron-aluminum type is added coincidentally with the size-adjusted fine dust coal or lignite, excellent coagulating and separating activities of the size-adjusted fine dust coal or lignite are rather inhibited by the presence of the coagulant, and sufficient results cannot be obtained. In this invention, it is preferred that addition of the coagulant of the iron-aluminum type is effected when 5 to 20 minutes, especially 5 to 10 minutes, have passed since addition of the size-adjusted fine dust coal or lignite. By adopting such procedures, catching and coagulation of colloidal solids in the sludge can be further ensured and the water content of the coal-containing concentrated sludge cake can be further lowered.

Thus, the starting sludge is separated into two phases, one of the supernatant liquor and the other of the coal-containing concentrated sludge, according to this invention. The supernatant liquor is taken out from the above, or the coal-containing concentrated sludge is withdrawn from the bottom. The so separated coal-containing concentrated sludge is, if desired, subjected to the filtration treatment to remove water therefrom. Also at this filtering and dehydrating step, prominent advantages are attained in this invention. More specifically, when the so separated sludge is introduced on a filtering material, coarser particles of the size-adjusted fine dust coal or lignite contained in the sludge or coarser particles carrying sludge solids coagulated thereon, are at first allowed to sediment on the filter cloth to form a precoat layer thereon, and then agglomerates of finer particles of the size-adjusted fine dust coal or lignite and sludge solids coagulated thereon are sucked and deposited in the form of a compressed sludge layer. Accordingly, in the process of this invention, filtration of agglomerates of finer particles of the fine dust coal or lignite and sludge solids coagulated thereon should naturally be accomplished through the precoat layer of the coarser particles of the fine dust coal or lignite, and removal of water can be performed very easily. Furthermore, the water content of the resulting filter cake is as low as 42 – 60 %. Therefore, this cake can readily be burnt out and it may be used sufficiently as fuel for incineration of rubbish and refuse.

Sludges treated with the aerobic digestion method exhibit a specific filtration resistancer $\gamma$ of $1.0 \times 10^{10}$ to $20.0 \times 10^{10}$ when filtered by the vacuum filtering method or $2.0 \times 10^{10}$ to $20.0 \times 10^{10}$ when filtered by the filter-press filtering method (Journal of Association of Drain and Sewerage, vol. 6, No. 57 and vol. 5, No. 55). In contrast, the coal-containing concentrated sludge according to the process of this invention, exhibits a specific filtration resistance $\gamma$ of $1 \times 10^6$ to $3 \times 10^6$. From the foregoing, it will readily be understood that the coal-containing concentrated sludge formed by the process of this invention is excellent in the filtering property.

It is preferred that the filtering step of this invention is practiced by employing the above-mentioned apparatus for the continuous dehydration of sludges.

In FIGS. 3-A and 3-B illustrating the arrangement of the apparatus of this invention, a liquid reservoir indicated as whole by symbol A and a filtering zone indicated as a whole by symbol B are disposed in the longitudinal direction of the apparatus. An endless filter cloth (shown by the dotted line in the drawings) is disposed so that it is continuously forwarded to liquid reservoir A and filtering zone B where vacuum suction filtration is effected.

The liquid reservoir A is provided with a bottom 2 disposed so that it is inclined to the liquid surface of the coal-containing concentrated sludge (which will be referred to merely as "coal-containing sludge" hereinbelow) fed to the liquid reservoir A and it crosses the liquid surface 1 at least at the portion connecting the liquid reservoir A with the filtering zone B. On the deepest side of the inclined bottom 2 there is provided a dike barrier 3 for overflowing excess of the coal-containing sludge fed, and a pond 5 for the coal-containing sludge is formed in the state surrounded by the bottom 2, the overflowing dike barrier 3 and both side planks 4. An overflow-receiving box 8 is provided at the external of the deepest side of the pond 5 to receive the excessive sludge overflown through the overflowing dike barrier 5. A pipe 9 is mounted on the overflow-receiving box 8 to take out the over-flown sludge. Above the deepest side of the pond 5 for the coal-containing sludge, a feed box 12 provided with a feed pipe 10 and a discharge opening 11 is mounted. Between the feed pipe 10 and discharge opening 11 of the feed box 12, a plurality of guide flappers 13 extending with a downward inclination and in opposite directions alternately, are mounted to impart a long passage to the stream of the coal-containing sludge while inhibiting occurrence of turbulence in the sludge stream. An overflow-discharging pipe 14 is mounted at the upper portion of the feed box 12 to overflow excess of the coal-containing sludge and discharge it from the feed box 12. The lower end of this overflow-discharging pipe 14 is opened to the overflow-receiving box 8 positioned below said pipe 14.

It is preferred that a box 15 for filtrate water is provided below the lower side of the bottom 2 of the liquid reservoir A in the sate having a contact therewith. In this case, filtering holes 16 are perforated throughout the bottom 2 or at a portion of the bottom 2 where the liquid depth is small. Thus, filtrate water is passed through the filter cloth C running on the upper side of the bottom 2 and the holes 16 perforated through the bottom 2, and then filtrate water is introduced into the box 15. A pipe 17 is mounted on the filtrate water box 15 for discharging filtrate water therefrom. The inside of the filtrate water box 15 may be maintained under atmospheric pressure or under slightly reduced pressure.

In the apparatus of this invention, a filtering zone B where vacuum suction filtration is effected is provided subsequently to the liquid reservoir B. The filtering zone B is constructed of a vacuum chamber 18 provided with a plurality of roll bars at the upper portion thereof. Roll bars 19 are supported rotatably on a machine frame and they are disposed so that filtrate water are introduced into the vacuum chamber 18 through clearances between roll bars 19. It is preferred that the roll bar 19 comprises a plurality of riffles disposed spacedly from each other, so that filtrate water is effectively forwarded through clearances formed between two adjoining riffles. Below the vacuum chamber 18, a liquid discharge pipe 20 is mounted to discharge filtrate water stored in the vacuum chamber.

In a preferable embodiment of the apparatus of this invention, a plurality of vacuum chambers 18, 18', 18'' ..., especially two or three vacuum chambers, are provided in the longitudinal direction of the apparatus, and the degree of decompression is heightened along the direction of the advance of the filter cloth. For instance, the dehydration efficiency can be heightened by maintaining the negative pressure (difference of the reduced pressure from atmospheric pressure) at 80 – 100 mm Hg ( absolute ) in the first vacuum chamber 18, 120 – 200 mm Hg ( absolute ) in the second vacuum chamber 18' and 250 – 400 mm Hg ( absolute ) in the third vacuum chamber 18''. Further, a negative pressure of up to 600 mm Hg may be attained in the final drum.

The apparatus of this invention is characterized in that an endless filter cloth C is continuously forwarded to a liquid reservoir A having an inclined bottom 2 crossing the liquid surface and a filtering zone B constructed of a vacuum chamber 18 provided with roll bars 19 mounted on the upper portion thereof; the endless filter cloth is so disposed that it is at first introduced to the bottom 2 of the liquid reservoir A while being kept in contact with the bottom 2 along a length sufficient to form a precoat layer of coarser particles of the size-adjusted fine dust coal or lignite on the surface of the endless filter cloth and then the filter cloth is taken out of the liquid reservoir A and introduced on the roll bars 19 of the filtering zone; and that the liquid reservoir A is connected pivotably with one end of the filtering zone B and is provided with a member for adjusting the elevation angle of the bottom 2 of the liquid reservoir A. When the apparatus of such structure is employed, it is made possible to form in advance a precoat layer of coarser particles contained in the coal-containing sludge on the filter cloth and adposit on the precoat layer agglomerates of finer particles and the sludge solids coagulated thereon, regardless of any variation in properties of the sludge, by appropriately adjusting the moving angle of the filter cloth, the liquid depth in the liquid reservoir, the horizontal length of the stored sludge and/or the storing capacity of the liquid reservoir. The above specific structure of the apparatus of this invention will be detailed below.

In FIG. 3-A, the filtering zone B for vacuum suction filtration is fixed almost horizontally in the longitudinal direction of the apparatus by means of supporting stanchions 21 and 22. One end of the liquid reservoir A where the liquid has the shallowest depth is connected with one end of the filtering zone B by means of a hinge 23 so that the liquid reservoir may be pivoted. The other end of the liquid reservoir A where the liquid depth is greatest is attached to a liquid reservoir-supporting stanchion 24, and this stanchion 24 is supported by a stretchable supporting stanchion 26 through an angle-changeable supporting hinge 25. An arc-like angle-changing guide stay 27 is mounted on side planks 4 of the pond of the liquid reservoir A or on the filtrate water box 16. At the end portion of the angle-changing guide stay 27, a plurality of adjusting holes 28 are provided to adjust the elevation angle of the bottom 2 of the liquid reservoir A. To the stanchion 21 is fixed an adjusting plate 29 provided with holes 28' corresponding with adjusting holes 28 of the angle-changing guide stay 27.

The adjustment of the elevation angle of the bottom 2 of the liquid reservoir A can be easily accomplished by moving vertically the stretchable supporting stanchion 26 so that the bottom 2 has a desired elevation angle, fixing the stanchion 26 at this position, and inserting angle-adjusting bolts 30 into adjusting holes 28 of the angle-changing guide stay 27 and corresponding holes 28' of the adjusting plate 29 fixed to the supporting stanchion 21, thereby to fix them. Of course, simultaneously with the adjustment of the elevation angle of the bottom 2, adjustment of the depth of the pond 5 for the coal-containing sludge and the horizontal storage length may be accomplished. In general, it is preferred that the elevation angle of the bottom 2 of the liquid reservoir A may be adjusted within a range of 0° to 20°.

In order to forward the filter cloth C to bottom 2 of the liquid reservoir A in contact therewith along a length sufficient to form a precoat layer of coarser particles of the fine dust coal or lignite on the filter cloth C, at the deepest portion of the pond 5 for the coal-containing sludge a roll bar 31 for pressing the filter cloth is provided. The endless filter cloth C is introduced into the bottom of the pond 5 by means of this pressing roll bar 31, and advances along the bottom 2 of the liquid reservoir A toward the shallower portion. During this passage, water is spontaneously removed through the filtering plate 16 having a plurality of holes perforated therethrough. Then, the filter cloth crosses the liquid surface and is forwarded on roll bars 19 of the filtering zone B. The pressing roll bar 31 is attached rotatably to the apparatus frame, and a sprocket or pulley 32 may be mounted on the shaft of the roll bar 31 to positively rotate it by means of a suitable power-transmitting mechanism ( not shown ). It is also possible to dispose the pressing roll bar 31 in a lower position so that the periphery of the pressing roll bar 31 crosses a little the extension line of the bottom 2, whereby the contact between the bottom 2 and filter cloth C can be made closer. A rubber seal 33 may be provided on the hinge 23 in order to maintain the liquid-tight state at the portion connecting the liquid reservoir A with the filtering zone B. For adjustment of the thickness of the layer of the coal-containing sludge on the filter cloth, it is possible to mount a slit controller 34a at the point where the filter cloth C is taken up from the liquid surface of the coal-containing sludge. Thus, the thickness of the coal-containing sludge on the filter cloth may be adjusted optionally.

In order to pull the filter cloth C forwarded on roll bars 19 of the filtering zone B for vacuum suction filtration, it is preferred that a drive drum 34 is provided on the forward side of the filtering zone B. As the drive drum 34 there may be employed either an ordinary drum having a smooth surface or a so-called drum filter installed with a vacuum suction filtering device therein. A discharge shoot 35 is provided in the position neighbouring the side or bottom of the drum 34 to collect filter cakes. Filter cakes on the filter cloth C are exfoliated therefrom by means of a suitable scraper ( not shown ) and then collected in the discharge shoot 35. In the embodiment illustrated in FIG. 3-B, in order to exfoliate filter cakes from the filter cloth effectively, the filter cloth C coming from the drum 34 is introduced to an auxiliary roll 34', and during this passage exfoliation of filter cakes from the filter cloth C is accomplished completely.

In order to impart a constant tension to the filter cloth C forwarded to the pressing roll bar 31 even when the elevation angle of the botton 2 of the liquid reservoir A is changed, an arm 36 is attached to the end point of the liquid reservoir-supporting stanchion 24, a suspension rod 37 is attached to this arm 36 so that it may move vertically, and a feed roll 39 is mounted rotatably on the end point of this suspension rod 37. It is desired that a worm screwed outwardly from the center is mounted on the feed roll 39 so that an extension force is given in the width direction of the filter cloth C. Thus, the filter cloth C is forwarded along the bottom 2 toward the point crossing the liquid surface through the pressing roll bar 32 mounted at the deeper portion of the pond 5 for the coal-containing sludge while being maintained under a constant tension by means of the feed roll 39. Then, the filter cloth C is introduced on roll bars 19 of the filtering zone and allowed to advance toward the drive drum 34 from the discharge side of the filtering zone. Then, the filter cloth C is forwarded onto the discharge shoot 35 where filter cakes are exfoliated from the filter cloth C. A water-washing tank 40 installed with a washing roll 41 is provided to wash the filter cloth C from which filter cakes have been exfoliated. The filter cloth C coming from the auxiliary roll 34' is introduced into the washing roll 41 in the water-washing tank 40 through a tension roll 42 and a guide roll 43, and then, it is forwarded again to the feed roll 39 via a guide roll 43', and guide rolls 44, 44', 44'' ....

In application of the apparatus of this invention to filtraton and dehydration of coal-containing sludges, a fine coal dust ( fine dust coal of low grade or powdery lignite ) in which finer particles having a size ranging from 100 mesh to 325 mesh occupy 30 to 50 % by weight, preferably 40 to 50 % by weight, of the whole particles and remaining particles have a size exceeding 100 mesh is incorporated in an excessive sludge or concentrated sludge discharged from a plant for treatment of waste waters in an amount of 2 to 10 % by weight, preferably 3 to 5 % by weight, based on the fine coal dust, and the admixture is allowed to stand still for 30 minutes to two hours to effect coagulation and sedimentation of sludge solids, whereby the supernatant liquor is separated from the coal-containing concentrated sludge at a volume ratio of about 7 : 3. The coal-containing concentrated sludge is fed to the feed box 12 through the feed pipe 10, and it is fed to the deepest portion of the pond 5 through the discharge opening 11 of the feed box 12. The coagulation state of the fine coal dust and sludge solids is partially destroyed during the pipe transportation and the sludge undergoes a turbulent action. However, this turbulent state is partially relaxed in the feed box 12 and the sludge solids are settled in the pond 5, whereby re-coagulation and sedimentation of finer particles of the fine coal dust and the sludge solids can be accomplished. At first coarser particles of the fine coal dust are deposited on the filter cloth C moving upwardly along the inclined bottom 2 of the pond 5 to form a precoat layer, and then, coagulates composed of finer particles and sludge solids or coagulates of sludge solids alone are sedimented and deposited on the precoat layer. At this time, the filter cloth C is pressed against the bottom 2 by means of the pressing roll bar 31 and gravity of the coal-containing sludge stored in the pond 5 is imposed on the filter cloth C. Therefore, in general, no vertical wavy movement of the filter cloth C is not observed. A part of water removed in the pond 5 is passed through the precoat layer, the filter cloth C and filtering holes 16 perforated through the bottom 2, dropped into the filtrate water box 15, and collected through the pipe 17 for withdrawing filtrate water.

The elevation angle of the bottom 2 is most preferably adjusted in the following manner depending on the kind of the sludge to be treated:

A. In the case of a dense and close sludge having a high viscosity, the elevation angle of the bottom 2 is adjusted to 5° to 15°.
B. In the case of a dense and close sludge having a medium viscosity, the elevation angle of the bottom 2 is adjusted to 3° to 7°.
C. In the case of a sludge having a low viscosity, the elevation angle of the bottom 2 is adjusted to 0° to 5°.

However, it is of course possible to adopt elevation angles other than mentioned above depending on the kind of the waste water from which the sludge to be treated has been derived.

An assembly of the precoat layer and layers of coagulated sludge solids or of the sludge, which has been formed on the filter cloth C in the pond 5 for the coal-containing sludge, is forwarded onto the roll bars 19 of the filtering zone B after its thickness is uniformalized and adjusted to 5 to 10 mm by means of the slit controller 34. In the filtering zone B, dehydration of said assembly is effectively accomplished by vacuum suction filtration.

Cakes from which water has been removed are exfoliated from the filter cloth by means of a scraper and are collected in the shoot 35 for discharge of the filter cakes.

In the apparatus of this invention, by adjusting the angle of the bottom of the liquid reservoir, namely the moving angle of the filter cloth, a precoat layer of coarser particles of the fine coal dust can be formed uniformly on the filter cloth regardless of variety of properties of sludges to be treated, and at the same time coagulates of finer particles of the fine coal dust and sludge solids, or sludges per se, can be deposited or coated on the precoat layer. Accordingly, in the apparatus of this invention, since filtration of sludges is accomplished through the precoat layer of coarser particles of the fine coal dust and the layer of coagulates containing finer particles of the fine coal dust, the filtration resistance is extremely low ( $\gamma = 1 \times 10^6$ to $3 \times 10^6$). As a result, the filtration can be performed very easily and the water content of the resulting filter cake is as low as 42 to 60 % by weight. Thus, filter cakes discharged from the apparatus of this invention can be effectively used as fuel for incineration of rubbish and refuse, as they are or after they have been dried slightly.

As explained hereinabove, in accordance with this invention, by adjusting the size distribution in a fine dust coal or lignite powder of low grade which can be easily obtained at a low cost and using such size-adjusted fine dust coal or lignite, it is made possible to effect coagulation and sedimentation of sludge solids promptly and in the highly concentrated dense state, and final filter cakes can be obtained in the form of a very low water content. Thus, this invention is very advantageous also from the viewpoint of prevention of environmental pollution.

This invention will now be illustrated more specifically by reference to Example.

EXAMPLE

The following coagulants were separately incorporated into an excessive sludge of a solid content of 5.460 ppm which had been taken from a concentration tank of a sewage treatment plant:

A. Fine dust coal having a size distribution shown by the curve 1 of FIG. 1 ( Fine Dust Coal No. 3 produced by Tainheiyo Tanko ) in an amount of 5 % by weight based on the sludge.

B. Oil carbon having an average particle size of 40 μ at a ratio of 80% and produced as a by-product in the petrochemical industry in an amount of 5 % by weight based on the sludge.

C. Fine dust coal described in A above in an amount of 5 % by weight based on the sludge and sulfuric acid-treated red mud ( Tradename: EDEX-S ) in an amount of 0.5 % by weight based on the sludge.

D. Oil carbon described in B above in an amount of 5 % by weight based on the sludge and the above-mentioned EDEX-S in an amount of 0.5 % by weight based on the sludge.

In the case of coagulants A and B, after addition of the coagulant, the sludge was stirred for 5 minutes and then allowed to stand still for 2 minutes. In the case of combination coagulants C and D, at first the fine dust coal or oil carbon was added to the sludge, the agitation was conducted for 5 minutes, the admixture was allowed to stand still for 2 minutes, and then EDEX-S was added thereto, following which the admixture was allowed to stand still for 2 minutes.

The supernatant liquor was separated, and the sediment of the coal-containing concentrated sludge was fed on a filter cloth composed of Saran No. 30001. The suction filtration was conducted under a negative pressure of 200 mm Hg. Results are shown in Table 1.

Table 1

| Coagulant | A this invention | B comparison | C this invention | D comparison |
|---|---|---|---|---|
| Volume ratio (%) of coal-containing concentrate to starting sludge | 36 | | | |
| Solid concentration (ppm) of supernatant liquor | (allowed to stand still for 30 minutes) 100 | (allowed to stand still for 30 minutes) 220 | (allowed to stand still for 30 minutes) 120 | (allowed to stand still for 30 minutes) 200 |
| Water content (%) of filter cake | 64.5 | 92.3 | 57.1 | 91.8 |
| Solid concentration (ppm) of filtrate water | 980 | 1,140 | 810 | 910 |
| Color of filtrate water | light gray | black | light gray | black |
| Ratio (%) of catching sludge solids | 96.4 | 91.0 | 98.3 | 90.6 |

From the results shown in Table 1, it will readily be understood that use of a fine dust coal or lignite having a specific size destribution, namely comprising finer particles having a specific smaller particle size and coarser particles having a specific greater particle size at a specific ratio is very important to coagulate and sediment sludge solids promptly in the highly concentrated dense state and to remove water from resulting filter cakes effectively.

What is claimed is:

1. A process for concentrating and separating solids from solid/liquid mixtures in the treatment of sewage sludge which comprises incorporating into such sludge 2 to 10 % by weight of fine dust coal or lignite particles having such a size distribution that 30 to 50% by weight of the whole particles have a finer size not greater than 100 mesh and 70 to 50% by weight of the whole particles have a coarser size exceeding 100 mesh; wherein the size distribution of the particles is such as to correspond with the size distribution curve (1) of FIG. 1 of the drawings, mixing the sewage sludge and fine dust coal or lignite particles under agitation, allowing the resulting admixture to stand still for about 20 minutes to about 2 hours to separate it into a coal-containing concentrated sludge and a supernatant liqour, feeding the coal-containing concentrated sludge onto a continuously moving filter cloth disposed so that it crosses, at a predetermined inclined angle, the surface of the coal-containing concentrated sludge, thereby to form on the filter cloth at first a precoat layer of coarser particles of the fine dust coal or lignite and then a layer of coagulates composed of finer particles of the fine dust coal or lignite and sludge solid, and conducting vacuum suction filtration from the back surface of the filter cloth, thereby to remove water from said layer.

2. A process set forth in claim 1, wherein the fine dust coal or lignite comprises particles having a size of from 150 mesh to 325 mesh in an amount of at least 30 % weight based on the whole particles and particles having a size exceeding 100 mesh in an amount of at least 50 % by weight based on the whole particles.

3. A process set forth in claim 1, wherein the fine dust coal or lignite has a calorific power of 3500 to 5000 Kcal/Kg and comprises ash components in an amount of 10 to 40 % by weight.

4. A process according to claim 1, wherein fine dust coal is incorporated with the sewage sludge.

5. A process for concentrating and separating solids from solid/liquid mixtures in the treatment of sewage sludge which comprises incorporating into such sludge 2 to 10% by weight of fine dust coal or lignite particles having a size distribution such that 30 to 50% by weight of the whole particles have a finer size not greater than 100 mesh and 70 to 50% by weight of the whole particles have a coarser size exceeding 100 mesh; wherein the size distribution of the particles is such as to correspond with the size distribution curve (1) of FIG. 1 of the drawings, mixing the sewage sludge and fine dust coal or lignite particles under agitation, incorporating into this mixture a coagulant comprising a mixture of iron and aluminum salts in an amount of from 1/50 to 1/10 by weight of the fine dust coal or lignite particles when 5 to 20 minutes have passed since the addition of said fine dust coal or lignite particles, allowing the resultant mixture to stand still for 20 minutes to 2 hours to separate it into a supernatant liquor and a coal-containing concentrated sludge, feeding the coal-containing concentrated sludge onto a continuously moving filter cloth disposed so that it crosses at a predetermined inclined angle, the surface of the coal-containing concentrated sludge, thereby to form on the filter cloth at first a precoat layer of coarser particles of the fine dust coal or lignite and then a layer of coagulates composed of finer particles of the fine dust coal or lignite and sludge solid, and conducting vacuum suction filtration from the back surface of the filter cloth thereby to remove water from said layer.

6. A process according to claim 5, wherein fine dust coal is incorporated with the sewage sludge.

* * * * *